(12) United States Patent
Matsui

(10) Patent No.: US 12,650,815 B2
(45) Date of Patent: Jun. 9, 2026

(54) COMPUTING APPARATUS AND METHOD FOR VERIFYING A FIRMWARE DIGITAL SIGNATURE AT BOOT TIME

(71) Applicant: Kioxia Corporation, Tokyo (JP)

(72) Inventor: Hajime Matsui, Yokohama (JP)

(73) Assignee: Kioxia Corporation, Tokyo (JP)

( * ) Notice: Subject to any disclaimer, the term of this patent is extended or adjusted under 35 U.S.C. 154(b) by 1031 days.

(21) Appl. No.: 17/470,996

(22) Filed: Sep. 9, 2021

(65) Prior Publication Data

US 2022/0300576 A1 Sep. 22, 2022

(30) Foreign Application Priority Data

Mar. 22, 2021 (JP) ................................. 2021-047484

(51) Int. Cl.
*G06F 7/72* (2006.01)
*H04L 9/30* (2006.01)
*H04L 9/32* (2006.01)
(52) U.S. Cl.
CPC ............ *G06F 7/725* (2013.01); *H04L 9/3066* (2013.01); *H04L 9/3252* (2013.01); *H04L 2209/122* (2013.01)
(58) Field of Classification Search
CPC .. G06F 7/725; G06F 7/727; G06F 2207/7219; H04L 9/3073; H04L 9/3247; H04L 9/3252; H04L 9/3093; H04L 9/3066; H04L 9/003; H04L 2209/08; H04L 2209/122
See application file for complete search history.

(56) References Cited

U.S. PATENT DOCUMENTS

| | | | | |
|---|---|---|---|---|
| 7,676,037 B2 * | 3/2010 | Jung | ....................... | G06F 7/725 |
| | | | | 713/168 |
| 9,391,773 B2 * | 7/2016 | Jacobson | ................ | H04L 9/003 |
| 2006/0045262 A1 * | 3/2006 | Orlando | .................. | G06F 7/725 |
| | | | | 380/28 |

FOREIGN PATENT DOCUMENTS

JP 2005-316038 A 11/2005

OTHER PUBLICATIONS

Ruan, Xiaoyu. Platform Embedded Security Technology Revealed [textbook]. Heinz Weinheimer, ISBN 978-1-4302-6571-9. pp. 57-116. Retrieved from the Internet: <URL: https://link.springer.com/book/10.1007/978-1-4302-6572-6> (Year: 2014).*

(Continued)

*Primary Examiner* — Andrew Caldwell
(74) *Attorney, Agent, or Firm* — Oblon, McClelland, Maier & Neustadt, L.L.P.

(57) ABSTRACT

A controller calculates aP by multiplying an integer a being 2 or more and less than $2^w$ and a coordinate value P; reads out, by w bits, a multiplication value k and generates a string of signed odd numbers d of w+1 bits; calculates dP by multiplying a head of the d and the P and inputs the dP to a variable; executes looping between processing for inputting, to the variable, a value obtained by doubling the variable w times and processing for calculating dP by multiplying the P and a second or after of the d and inputting, to the variable, an addition result of the dP and the variable; and calculates a value by multiplying the P and a value based on lower 2 bits of the k and outputs kP by adding the calculated value and the variable.

14 Claims, 10 Drawing Sheets

```
if (Q == O) {
    Q = cP
} else if (Q == cP) {
    Q = 2cP
} else {
    Q = EC_ADD(Q, cP)
}
```

(56) References Cited

OTHER PUBLICATIONS

Montgomery modular multiplication [online]. Wikipedia. [edited on Dec. 13, 2018]. Retrieved from the Internet: <URL: https://web.archive.org/web/20181229063237/https:/en.wikipedia.org/wiki/Montgomery_modular_multiplication#References> (Year: 2018).*

* cited by examiner

FIG.1

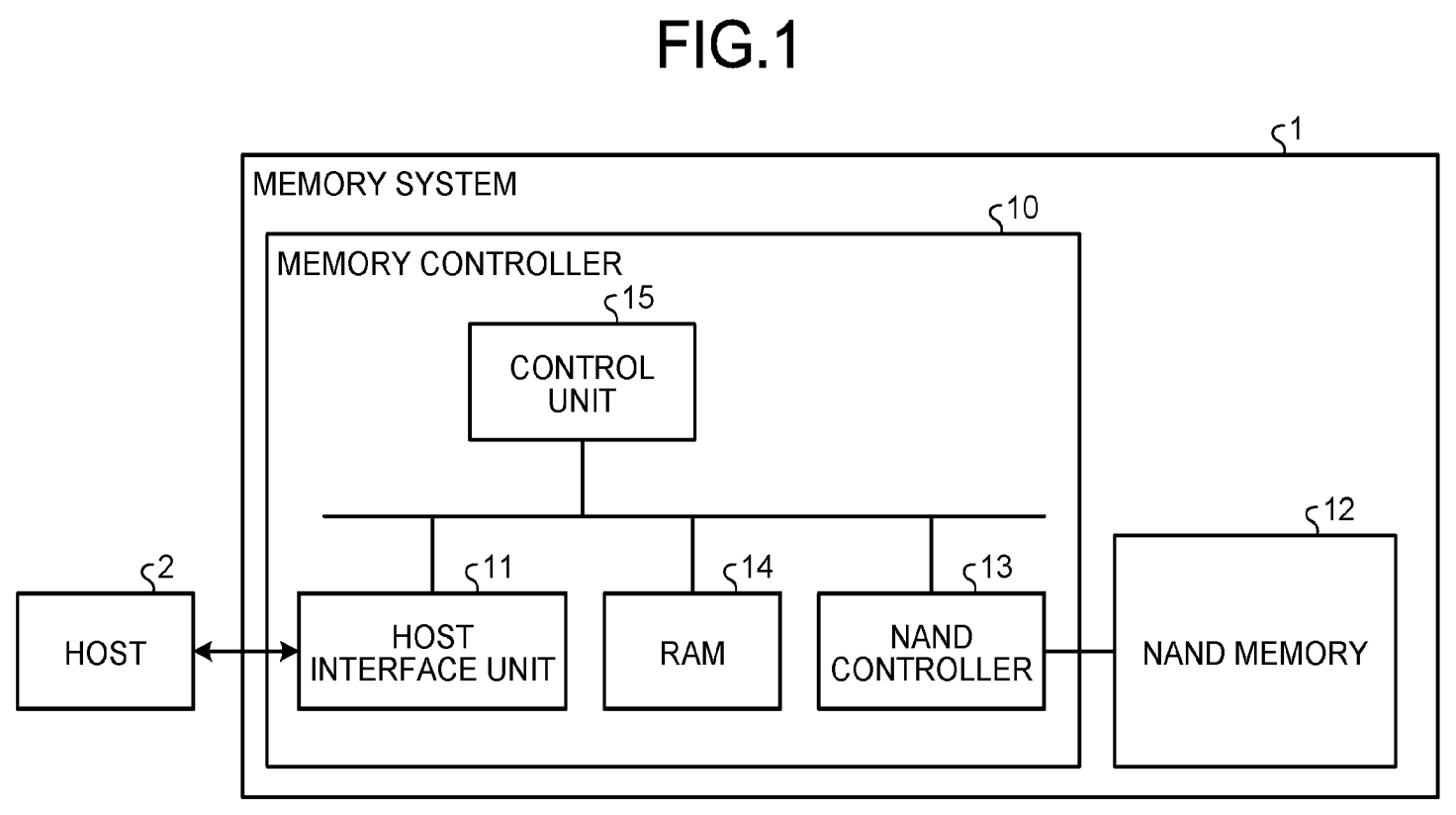

MEMORY SYSTEM 1

MEMORY CONTROLLER 10

CONTROL UNIT 15

HOST INTERFACE UNIT 11

RAM 14

NAND CONTROLLER 13

NAND MEMORY 12

HOST 2

```
MEMORY SYSTEM                              1

STORAGE UNIT                          30

SIGNATURE
    PROCESSING UNIT                       31

SCALAR MULTIPLICATION                 32
    UNIT

ACQUISITION UNIT                  321

PREPROCESSING                     322
        UNIT

TRANSFORMATION                    323
        UNIT

CORRECTION UNIT                   324

ELLIPTIC CURVE                    325
        COMPUTING UNIT

SCALAR                            326
        MULTIPLICATION
        OUTPUT UNIT
```

```
Q = P
 for (j =m-2; j>=0; j=j-1) {
   Q = 2Q
   if (k(j)≠0) Q = Q + P
 }
```

FIG.4

```
l = (m + (w − 1)) / w            // DIVIDE m BY w, AND ROUND UP DIGITS AFTER DECIMAL POINT
d(l-1) = k((l-1)w+(w-1))×2^(w-1) + ··· + k((l-1)w+2)×2^2 + k((l-1)w+1)×2^1 + 1  // 0 < d(l-1) < 2^w
for (j=l-2; j>=0; j=1) { // -2^w < d(j) < 2^w
  if (j > 0) {
    d(j) = − (1 − k(jw+w))×2^w + k(jw+(w-1))×2^(w-1) + ··· + k(jw+2)×2^2 + k(jw+1)×2^1 + 1
  } else {
    d(0) = − (1 − k(w))×2^w + k(w-1)×2^(w-1) + ··· + k(2)×2^2 + (1 − k(1))×2^1 + 1
  }
}
e = (k(1)×2 − 1)×2^1 + (k(0) − 1)    // e ∈ { -3, -2, 1, 2 }
```

FIG.5

```
PRECALCULATE 2P
PRECALCULATE aP FOR EACH ODD NUMBER a
THAT IS 3 OR MORE AND LESS THAN 2^w
Q = d(l-1)P
for ( j =l-2; j>=0; j=j-1) {
  for (i=0; i<w; i=i+1) Q = 2Q
  Q = Q + d( j )P
}
Q = Q + eP
```

FIG.6

```
l = (m + (w − 1)) / w
PRECALCULATE 2P
PRECALCULATE aP FOR EACH ODD NUMBER a THAT IS 3 OR MORE AND LESS THAN 2^w
d = k((l-1)w+(w-1))×2^(w-1) + ···+ k((l-1)w+2)×2^2 + k((l-1)w+1)×2^1 + 1
Q = dP
for (j=l-2; j>=0; j=j-1) {
  for (i=0; i<w; i=i+1) Q = 2Q
  if (j > 0) {
    d = −(1 − k(jw+w))×2^w + k(jw+(w-1))×2^(w-1) + ···+ k(jw+2)×2^2 + k(jw+1)×2^1 + 1
  } else {
    d = −(1 − k(w))×2^w + k(w-1)×2^(w-1) + ···+ k(2)×2^2 + (1 − k(1))×2^1 + 1
  }
  Q = Q + dP
}
e = (k(1)×2 − 1)×2^1 + (k(0) − 1)
Q = Q + eP
```

FIG.8

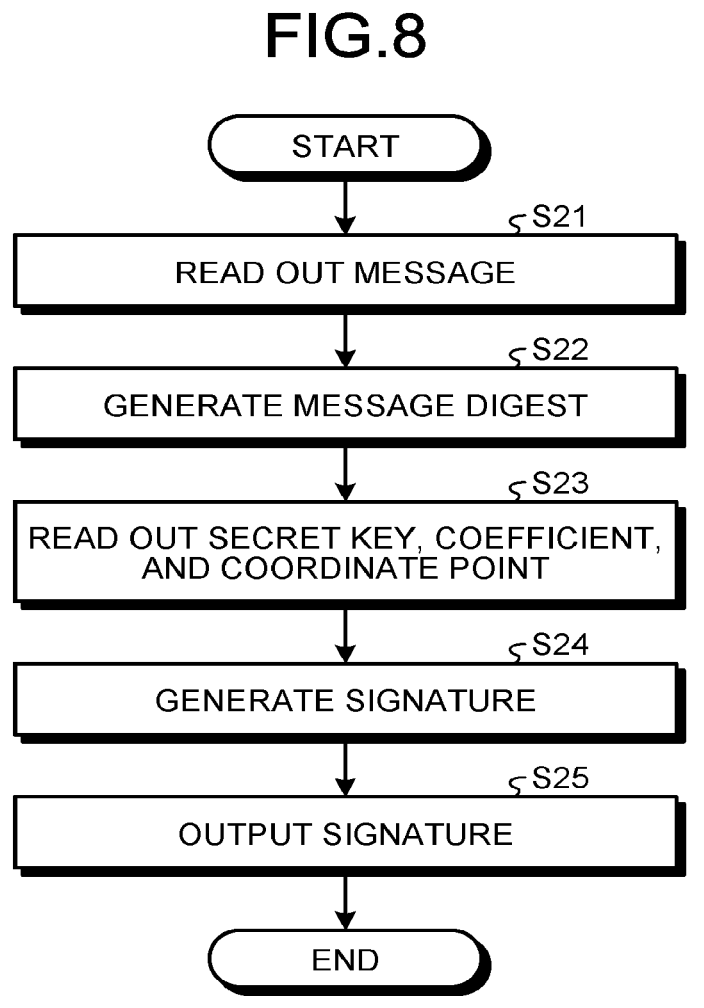

START

S21

READ OUT MESSAGE

S22

GENERATE MESSAGE DIGEST

S23

READ OUT SECRET KEY, COEFFICIENT, AND COORDINATE POINT

S24

GENERATE SIGNATURE

S25

OUTPUT SIGNATURE

END

```
START
```

↓

S31
READ OUT MESSAGE

↓

S32
GENERATE MESSAGE DIGEST

↓

S33
READ OUT PUBLIC KEY, COEFFICIENT,
COORDINATE POINT, AND SIGNATURE

↓

S34
VERIFY SIGNATURE

↓

S35
OUTPUT SIGNATURE VERIFICATION
RESULT

↓

```
END
```

```
if (Q == O) {
   Q = cP
} else if (Q == cP) {
   Q = 2cP
} else {
   Q = EC_ADD(Q, cP)
}
```

FIG.11

```
if (Q == O) {
   Q = cP
} else if (Q == cP) {
   Q = EC_DBL(cP)
} else {
   Q = EC_ADD(Q, cP)
}
```

FIG.12

```
(R, Q_eq_O, Q_eq_cP) = EC_ADD(Q, cP)
if (Q_eq_O) {
   Q = cP
} else if (Q_eq_cP) {
   Q = EC_DBL(cP)
} else {
   Q = R
}
```

FIG.13

```
(R, Q_eq_O, Q_eq_cP) = EC_ADD(Q, cP)
if (Q_eq_O) {
  Q = cP
} else if (Q_eq_cP) {
  Q = 2cP
} else {
  Q = R
}
```

COMPUTING APPARATUS AND METHOD FOR VERIFYING A FIRMWARE DIGITAL SIGNATURE AT BOOT TIME

CROSS-REFERENCE TO RELATED APPLICATIONS

This application is based upon and claims the benefit of priority from Japanese Patent Application No. 2021-047484, filed on Mar. 22, 2021; the entire contents of which are incorporated herein by reference.

FIELD

Embodiments described herein relate generally to a computing apparatus and a method.

BACKGROUND

There has been scalar multiplication processing as a main computation of elliptic curve cryptography. The scalar multiplication processing multiplies a rational point and a scalar value together. In this scalar multiplication processing, there is a technique for performing computation processing from a most significant bit of the scalar value in a direction of a least significant bit thereof. It is desired that this scalar multiplication processing be processed at high speed since the scalar multiplication processing is used for a digital signature.

BRIEF DESCRIPTION OF THE DRAWINGS

FIG. 1 is a diagram illustrating an example of a configuration of a memory system to which a computing apparatus according to embodiments is applied;

FIG. 4 is a diagram illustrating a pseudo code of transformation processing by a transformation unit according to the embodiments;

FIG. 5 is a diagram illustrating a pseudo code of a scalar multiplication according to the embodiments;

FIG. 6 is a diagram illustrating a pseudo code in which pseudo codes illustrated in FIG. 4 and FIG. 5 are combined with each other;

FIG. 8 is a flowchart illustrating a signature generation processing procedure according to the embodiments;

FIG. 11 is a diagram illustrating an example of another pseudo code of addition processing according to a second embodiment;

FIG. 12 is a diagram illustrating an example of another pseudo code of addition processing according to a second embodiment; and FIG. 13 is a diagram illustrating an example of a pseudo code of addition processing according to the embodiments.

DETAILED DESCRIPTION

Figures 2, 3:
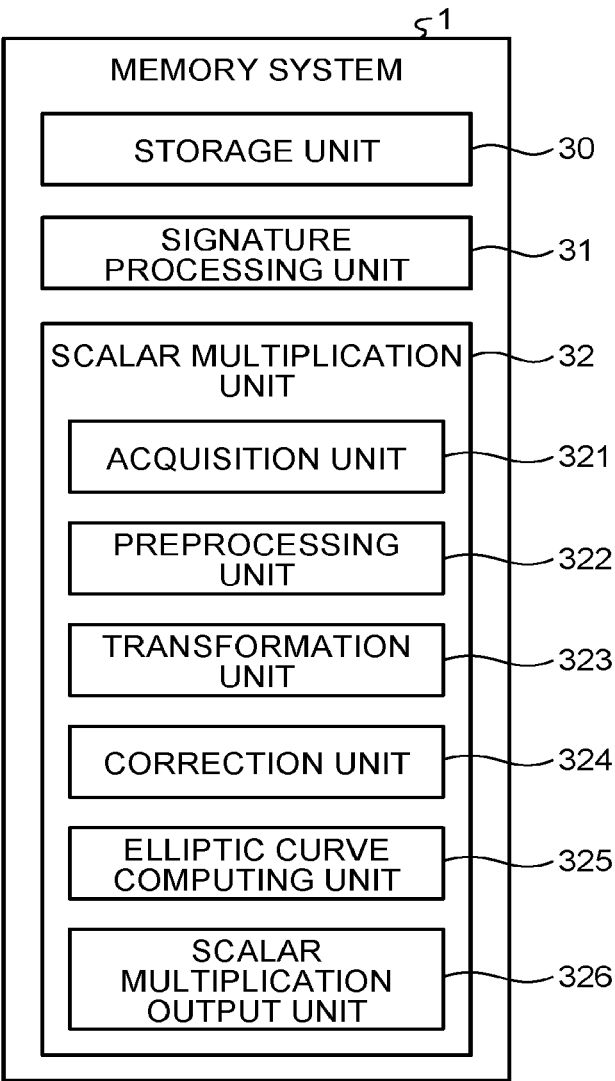
FIG. 2 is a block diagram illustrating an example of a functional configuration of a memory system 1 according to the embodiments.
FIG. 3 illustrates a pseudo code that calculates a scalar multiplication.

According to the embodiments, a computing apparatus includes a controller. The controller calculates aP by multiplying at least one integer a and a coordinate value P at a particular point together, the integer a being 2 or more and less than $2^w$ (w is an integer satisfying $1<w$); reads out a multiplication value k being a bit string of m-bit (m is an integer) by every w bits at a maximum in order from a most significant bit to a least significant bit, and generates a string of signed odd numbers d of $w+1$ bits at a maximum; calculates dP by multiplying a head of the string of signed odd numbers d and the coordinate value P together, and inputs the dP to a variable; executes loop processing predetermined times, the loop processing including multiplication processing for inputting, to the variable, a value obtained by doubling the variable w times, and processing for calculating dP by multiplying the coordinate value P and a second or after of the string of signed odd numbers d together, and inputting, to the variable, a result of adding the dP and the variable to each other; and calculates a value by multiplying the coordinate value P and a value being based on lower 2 bits of the multiplication value k together, and outputs, as kP, a value obtained by adding the calculated value and the variable to each other.

As an example, a description will be given below of a memory system and a method, to which a computing apparatus according to embodiments is applied. Note that a device to which the computing apparatus according to the embodiments can be applied is not limited to only the memory system. The computing apparatus according to the embodiments is applicable to an arbitrary device including: a memory in which a computer program is to be stored; and a processor that executes the computer program. Referring to the accompanying drawings, a detailed description will be given of the memory system to which the computing apparatus according to the embodiments is applied. Note that the present invention is not limited to the embodiments.

EMBODIMENTS

FIG. 1 is a diagram illustrating an example of a configuration of the memory system to which the computing apparatus according to the embodiments is applied. For example, this memory system 1 is a solid state drive (SSD). As an example, a case of using a NAND-type flash memory (hereinafter, referred to as a "NAND memory") as a nonvolatile memory will be described below.

The memory system 1 is configured to be connectable to a host 2. For example, a central processing unit (CPU), a personal computer, a portable information instrument, a server, or the like apply to the host 2. As an interface standard of communication between the memory system 1 and the host 2, an arbitrary interface standard is adoptable. Two or more of the hosts 2 may be simultaneously connected to the memory system 1. The host 2 and the memory system 1 may be connected to each other over a network.

The memory system 1 executes transmission/reception of data with the host 2 in accordance with an access command from the host 2.

The memory system 1 includes a NAND memory 12 and a memory controller 10. The memory controller 10 includes a host interface unit 11, a NAND controller 13, a random access memory (RAM) 14, and a control unit 15.

The control unit 15, for example, includes one or more processors. The control unit 15 executes a control of the memory system 1 by executing firmware stored in advance at a predetermined position in the memory system 1. A storage position of a program is set arbitrarily. For example, the firmware is stored in advance in the NAND memory 12, and is loaded on the RAM 14 at the time of starting. The control unit 15 executes the firmware loaded on the RAM 14. The control of the memory system 1 includes a plurality of processing. Part of or all the plurality of processing to be executed by the control unit 15 may be implemented by a hardware circuit. Moreover, the control unit 15 may be a hardware circuit. Each processing to be executed by the control unit 15 will be described later.

The host interface unit 11 is an interface device for causing the memory system 1 to communicate with the host 2. For example, under control of the control unit 15, the host interface unit 11 executes transfer of user data between the host 2 and the RAM 14.

The NAND controller 13 is an interface device for an access to the NAND memory 12. Under control by the control unit 15, the NAND controller 13 executes transfer of the user data or management information between the RAM 14 and the NAND memory 12. Although details are omitted, the NAND controller 13 can perform error correction processing.

The NAND memory 12 is a nonvolatile storage medium that functions as a storage. The NAND memory 12 includes one or more chips.

The RAM 14 is a storage medium for temporarily storing data. The RAM 14 may be built in the memory controller 10, or may be mounted outside the memory controller 10. The RANI 14, for example, a storage medium with a higher speed than that of the NAND memory 12, is adoptable. As the RANI 14, for example, a volatile or nonvolatile storage medium is adoptable. As the RANI 14, for example, there are adoptable a dynamic RAM (DRAM), a static RAM (SRAM), a ferroelectric RAM (FeRAM), a magnetoresistive RAM (MRAM), a phase change RAM (PRAM), and the like.

FIG. 2 is a block diagram illustrating an example of a functional configuration of the memory system 1 according to the embodiments. As illustrated in FIG. 2, the memory system 1 includes: a storage unit 30; a signature processing unit 31; and a scalar multiplication unit 32 (also referred to as a "controller").

The storage unit 30 stores various types of information. For example, the storage unit 30 stores a secret key, a public key, a curve coefficient, a coordinate value, a message, and signature information. The storage unit 30 is implemented by the RAM 14 and the NAND memory 12.

The signature processing unit 31 performs signature processing using a random value and the coordinate value. The signature processing unit 31 is implemented by the control unit 15. The signature processing unit 31 generates a random number, and inputs, to the scalar multiplication unit 32, a multiplication value k, which is a value of the random number, and a coordinate value P of a particular point included in a particular elliptic curve. The scalar multiplication unit 32 is included, for example, in the memory controller 10. Processing by the scalar multiplication unit 32 may be implemented in such a manner that the processor executes a predetermined program, or part of, or all the processing to be executed by the scalar multiplication unit 32 may be implemented by the hardware circuit. The multiplication value k is represented by a bit string of m bits. The respective bits of a scalar are represented by $k(m-1)$, $k(m-2), \ldots, k(1)$, and $k(0)$ in order from an MSB to an LSB. Moreover, $k(m-1)=1$ is established. The signature processing unit 31 acquires a coordinate value kP from the scalar multiplication unit 32. Using the coordinate value kP, the signature processing unit 31 performs signature generation and signature verification.

Note that the above-described coordinate value P may be expressed by either homogeneous coordinates (projective coordinates) or Jacobi coordinates.

The scalar multiplication unit 32 calculates the coordinate value kP obtained by performing a scalar multiplication, by the multiplication value k, for the coordinate value P of the particular point included in the particular elliptic curve. The scalar multiplication unit 32 is implemented by the control unit 15. The scalar multiplication unit 32 acquires the coordinate value P and the multiplication value k from the signature processing unit 31, and calculates the coordinate value kP using these values.

With reference to FIG. 3, a description will be given of a general method of the scalar multiplication. FIG. 3 illustrates a pseudo code that calculates the scalar multiplication. As illustrated in FIG. 3, in order from the most significant bit of k, a variable Q is doubled and the coordinate value P is added to the variable Q on the basis of a value of $k(j)$.

This computation needs to iteratively calculate addition and doubling of points on the elliptic curve, so that computation cost is extremely large. Moreover, whether or not to perform such point addition is determined in response to whether each bit of the scalar is 0 or 1. Thus, it becomes undesirably possible to estimate the number of 1 included in the scalar from a processing time of the whole in such an implementation. However, in such a use case as signing, the value of the scalar is confidential information, and accordingly, it is required to perform the computation within a constant time irrespective of the value of the scalar from a viewpoint of security.

Moreover, in order to implement high-speed processing in a constant time, a method is conceived in which a scalar multiplication is performed after performing a scalar transformation into such an expression that each digit becomes a signed non-zero integer. In particular, in a case where a plurality of bits are processed collectively, high-speed processing is enabled.

In the scalar transformation and the scalar multiplication, the respective bits of the scalar are sequentially scanned, and whether a scanning order is "from MSB to LSB" or "from LSB to MSB" differs for each of methods. At this time, if the scanning orders of the scalar transformation and the scalar multiplication are the same, then it is possible to perform the scalar transformation and the scalar multiplication at one time. If the scanning orders are different from each other, then there are required two passes of processing of performing the scalar transformation to store all calculation results and then newly performing the scalar multiplication.

Moreover, the scalar multiplication is often calculated by the homogeneous coordinates or the Jacobi coordinates. In such a case, when the method where the scanning order is "from MSB to LSB" like the pseudo code illustrated in FIG. 3 is employed, a Z coordinate of P can be fixed to 1. As a result, speedup of computation is easier to implement than in the method where the scanning order is "from LSB to MSB". Hence, it is desired that such methods that both of the scalar transformation and the scalar multiplication are performed in the scanning order "from MSB to LSB" be combined with each other.

Considering the above, the scalar transformation and the scalar multiplication are processed every plurality of bits in the scanning order of "from MSB to LSB", whereby the high-speed processing is implemented. Specifically, the scalar multiplication unit 32 performs w times of doublings for the coordinate value P, thereby implementing the high-speed processing. Herein, w is an integer that satisfies $1<w<m$, and 1 is an integer that satisfies $1 \times w \geq m$.

Returning to FIG. 2, the scalar multiplication unit 32 includes an acquisition unit 321, a preprocessing unit 322, a transformation unit 323, a correction unit 324, an elliptic curve computing unit 325, and a scalar multiplication output unit 326.

The acquisition unit 321 acquires the coordinate value P and the multiplication value k from the signature processing unit 31. The preprocessing unit 322 precomputes values for processing the addition and doubling of the points on the elliptic curve. For example, the preprocessing unit 322 calculates aP obtained by multiplying an integer a, which is 2 or more and less than $2^w$, and the coordinate value P of the particular point together.

The transformation unit 323 reads out the multiplication value k by an amount of w bits at the maximum in order from the most significant bit to the least significant bit, and generates signed odd numbers d of w+1 bits at the maximum. For example, the transformation unit 323 reads out the multiplication value k by every w bits in order from MSB, and converts the multiplication value k into a non-zero integer string $d(l-1)$, $d(l-2)$, . . . , $d(1)$, and $d(0)$.

The correction unit 324 calculates a value e that is based on lower 2 bits of the multiplication value k. Moreover, the correction unit 324 causes the elliptic curve computing unit 325 to execute, by using the calculated value, computation processing for the points on the elliptic curve.

An example of a pseudo code that calculates $d(l-1)$, $d(l-2)$, . . . , $d(1)$, $d(0)$, and e is illustrated in FIG. 4. FIG. 4 is a diagram illustrating the pseudo code of the transformation processing by the transformation unit 323 according to the embodiments.

Note that k(i)=0 is defined for i≥m. For each j in $l-1≥j≥0$, bits to be read out from k when calculating d(j) by the transformation unit 323 are w bits at the maximum.

Moreover, the transformation unit 323 reads out each bit of k only once. The transformation unit 323 refers to the lower 2 bits of k when calculating e. The transformation unit 323 may hold in advance a value of k(1) read out when calculating d(0) and may newly read out only k(0) when calculating e.

Since k(i) takes either value of 0 or 1 when the transformation unit 323 calculates d(j), (1−k(i)) can be obtained by bit inversion. That is, the transformation unit 323 is capable of obtaining d(j) by a simple calculation that w bits at the maximum are just read out from k and some bits thereof are inverted.

The elliptic curve computing unit 325 performs the computation processing for the points on the elliptic curve. For example, the elliptic curve computing unit 325 performs multiplication processing for inputting, to a variable, a value obtained by doubling the variable w times. Moreover, the elliptic curve computing unit 325 performs addition processing for calculating dP obtained by multiplying the coordinate value P and the signed odd number d on or after a second bit from the most significant bit together and inputting a result of adding this dP with the variable to itself. The scalar multiplication output unit 326 outputs kP calculated by the elliptic curve computing unit 325 and the like.

Herein, a calculation example of the scalar multiplication will be described with reference to FIG. 5. FIG. 5 is a diagram illustrating the pseudo code of the scalar multiplication according to the embodiments. As a premise, it is assumed that the transformation unit 323 calculates d(j), and that the correction unit 324 calculates e.

The preprocessing unit 322 precomputes 2P, and further precomputes aP for each odd number a that is 3 or more and less than $2^w$. The elliptic curve computing unit 325 calculates $d(l-1)P$ and inputs a calculation result to the variable Q. Moreover, during a state that j is 0 or more, the elliptic curve computing unit 325 performs w times of doublings for the variable Q and adds the variable Q and d(j)P to each other. Finally, the elliptic curve computing unit 325 adds the variable Q and eP to each other, and ends the processing.

For each j in $l-1≥j≥0$, an absolute value of d(j) becomes an odd number that is less than $2^w$, and e becomes any value out of −3, −2, 1, and 2. Therefore, the elliptic curve computing unit 325 can select d(j)P and eP from P and such points thus precomputed. Note that, due to the nature of the computation on the elliptic curve, it is possible to calculate Q+aP and Q+(−a)P=Q−aP within the same processing time when aP is precomputed, and, accordingly, it is not necessary to precompute a scalar multiplication of negative numbers. That is, a scalar multiplication for an odd number that satisfies 2 and $3≤a<2^w$ is obtained, and totally $2^{w-1}$ points are precomputed and held in advance.

Since $\Sigma_{m-1>j>0}k(j)\times2^j=\Sigma_{l-1>j>0}d(j)\times2^{jw}+e$ is established, it is understood that calculation results become equal to each other between the case of calculating kP by the pseudo code illustrated in FIG. 3 and the case of calculating kP by combining the pseudo codes illustrated in FIGS. 4 and 5 with each other.

The calculation of aP for each odd number a may be sequentially calculated such that 3P is obtained by P+2P, 5P is obtained by 3P+2P, . . . , and (2i+1)P is obtained by (2i−1)P+2P.

When kP is calculated by the pseudo code illustrated in FIG. 3, the doubling is performed m−2 times and the addition is performed m−2 times at the maximum. By contrast, when the pseudo codes illustrated in FIG. 4 and FIG. 5 are combined with each other, the doubling is performed 1+(l−2)w times, and the addition is performed $2^{w-1}-1+l-1$ times.

For example, when kP is calculated for m=256, which is often used, by the pseudo code illustrated in FIG. 3, the doubling is performed 254 times and the addition is performed 254 times at the maximum. On the other hand, when w=2 is used and kP is calculated by combining the pseudo codes illustrated in FIG. 4 and FIG. 5 with each other, the doubling is performed 253 times and the addition is performed 128 times.

A calculation may be performed by a pseudo code illustrated in FIG. 6 by combining the pseudo codes illustrated in FIG. 4 and FIG. 5 with each other. Note that a flowchart (FIG. 7) that is based on the pseudo code illustrated in FIG. 6 will be described later. When the pseudo codes illustrated in FIG. 4 and FIG. 5 are executed continuously, it is necessary to hold values of single d and single e in a memory region; however, since the values of d and e are immediately used in the case of using the pseudo code illustrated in FIG. 6, such a memory region becomes unnecessary.

Figure 7:
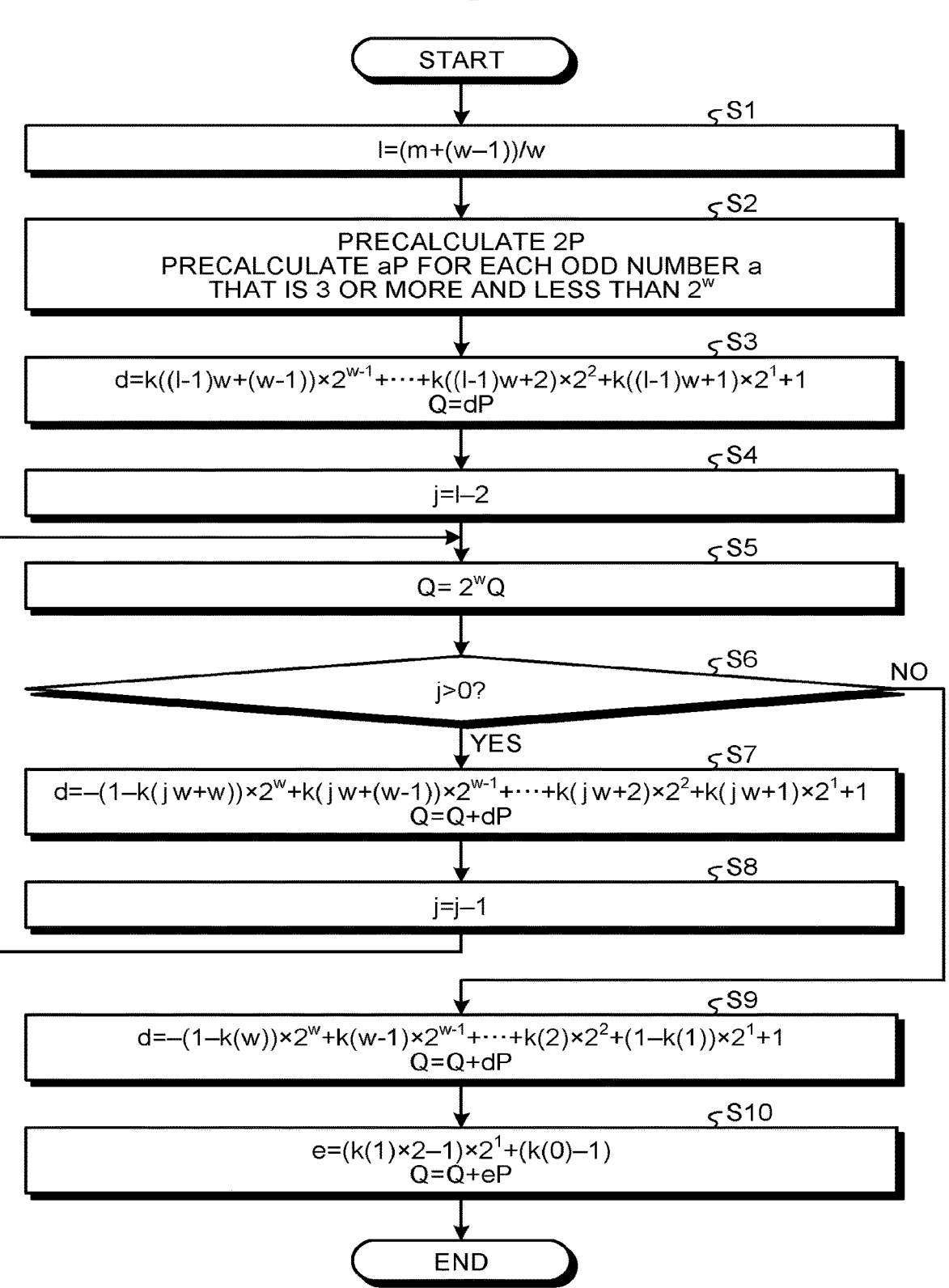
FIG. 7 is a flowchart illustrating a processing procedure according to a first embodiment.

Next, a processing flow according to a first embodiment will be described with reference to FIG. 7. FIG. 7 is a flowchart illustrating a processing procedure according to the first embodiment. Moreover, the flowchart illustrated in FIG. 7 is based on the pseudo code illustrated in FIG. 6.

First, the transformation unit 323 calculates I, which is used at the time of calculating the signed odd number d, on the basis of m and w (step S1). Subsequently, the preprocessing unit 322 calculates 2P and aP for each odd number a, which is 3 or more and less than $2^w$ (step S2). Subsequently, the transformation unit 323 calculates the signed odd number d, and the elliptic curve computing unit 325 calculates dP and inputs this dP to the variable Q (step S3).

Then, the elliptic curve computing unit 325 inputs I−2 to j (step S4) and performs w times of doublings for the value of the variable Q (step S5). When j exceeds 0 (step S6: Yes), the transformation unit 323 calculates the signed odd number d, and the elliptic curve computing unit 325 calculates dP, and inputs a value, which is obtained by adding this dP and the variable Q to each other, to the variable Q (step S7). Then, j is decremented (step S8), and the processing proceeds to step S5.

When j becomes 0 or less in step S6 (step S6: No), the transformation unit 323 calculates the signed odd number d, and the elliptic curve computing unit 325 calculates dP and inputs a value, which is obtained by adding this dP and the variable Q to each other, to the variable Q (step S9). Then, the correction unit 324 calculates e, and the elliptic curve computing unit 325 calculates eP, inputs a value, which is obtained by adding this eP and the variable Q to each other, to the variable Q, and outputs, as kP, a value which is input to this variable Q. (step S10).

Signature Generation Processing

Next, a procedure of the signature generation processing will be described with reference to FIG. 8. FIG. 8 is a flowchart illustrating the signature generation processing procedure according to the embodiments.

First, the signature processing unit 31 reads out a message from the storage unit 30 (step S21). The message refers to an object on which signature processing is performed. For example, the message is a computer program code of firmware or the like to be executed by the control unit 15, or system information of the memory controller 10. The system information may include any or all of a vendor name, a model name, and a serial number.

Subsequently, the signature processing unit 31 generates, by using a hash function, a message digest that is a hash value of the message (step S22). This hash function is a function that uses a message as an input, compresses this into data with a predetermined bit length, and outputs the data as a hash value.

Subsequently, the signature processing unit 31 reads out, from the storage unit 30, the secret key, a coefficient of the elliptic curve, and the coordinate value P being a particular point on the elliptic curve (step S23). The signature processing unit 31 generates the multiplication value k being a random number, and inputs the multiplication value k and the coordinate value P to the scalar multiplication unit 32. Then, the signature processing unit 31 acquires the coordinate value kP from the scalar multiplication unit 32, and generates signature data by means of a known technique using the hash value, the secret key, the multiplication value k, and the coordinate value kP (step S24). Note that the signature processing unit 31 may further use an order and coefficient of the coordinate value P when generating the signature data. Subsequently, the signature processing unit 31 outputs the generated signature data to the storage unit 30 (step S25). The above-mentioned signature processing is constant time processing, so that the processing time becomes constant irrespective of the value of the secret key.

Signature Verification

Figures 9, 10:
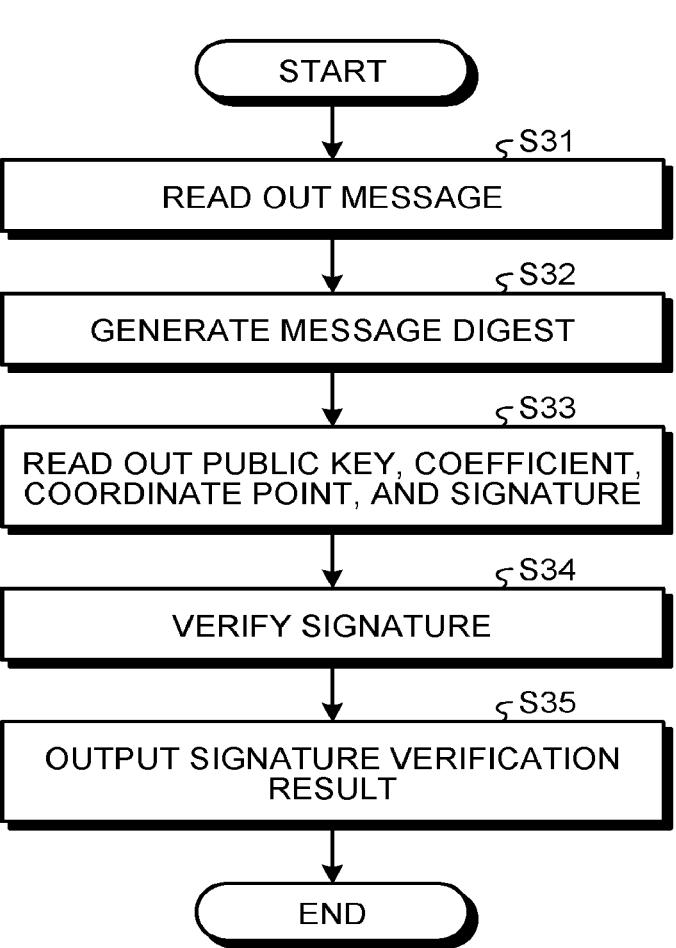
FIG. 9 is a flowchart illustrating a signature verification processing procedure according to the embodiments.
FIG. 10 is a diagram illustrating an example of a pseudo code of addition processing.

Next, a procedure of the signature verification will be described with reference to FIG. 9. FIG. 9 is a flowchart illustrating a signature verification processing procedure according to the embodiments.

First, the signature processing unit 31 reads out a message from the storage unit 30 (step S31).

Subsequently, the signature processing unit 31 generates, by using a hash function, a message digest that is a hash value of the message (step S32).

Subsequently, the signature processing unit 31 reads out, from the storage unit 30, the signature data, the public key, the coefficient of the elliptic curve, and the coordinate value P being a particular point on the elliptic curve (step S33).

Subsequently, the signature processing unit 31 performs signature verification. Specifically, the signature processing unit 31 inputs, to the scalar multiplication unit 32, the multiplication value k, which is a value calculated based on the signature data and the hash value, and the coordinate value P, and performs the signature verification by means of a known technique on the basis of the coordinate value kP output from the scalar multiplication unit 32 (step S34). The signature processing unit 31 outputs a signature verification result that indicates whether or not coincidence of the signature is made (step S35).

In the above-mentioned signature verification processing, the processing by the scalar multiplication unit 32 is processed at high speed, and, accordingly, the signature verification at the time of starting can be processed at high speed, resulting in contribution to shortening a boot time. Moreover, since the scalar is not confidential information in the signature verification, constant time processing may be directly used, or more speedup may be implemented by transforming the processing of the scalar transformation so as to allow an integer sequence to contain 0.

In the above-mentioned embodiment, the scalar multiplication unit 32 of the memory system 1 calculates aP obtained by multiplying the integer a being 2 or more and less than $2^w$ and the coordinate value P at the particular point together; reads out the multiplication value k, which is the m-bit bit string, by an amount of w bits at the maximum in order from the most significant bit to the least significant bit to generate the signed odd numbers d of w+1 bits at the maximum; calculates dP obtained by multiplying the signed odd number d and the coordinate value P together to input this dP to the variable Q; performs loop processing predetermined times for multiplication processing for inputting, to the variable Q, the value obtained by doubling the variable Q w times and processing for calculating dP obtained by multiplying the coordinate value P and the second or after signed odd number d from the most significant bit together to input, to the variable Q, a result of adding this dP and the variable Q to each other; and calculates a value obtained by multiplying the coordinate value P and a value that is based on lower 2 bits of the multiplication value k together to output, as kP, a value obtained by adding the calculated value and the variable Q to each other.

In this case, the scalar multiplication unit 32 processes the scalar transformation and the scalar multiplication every plurality of bits in the scanning order "from MSB to LSB". As described above, the scalar multiplication unit 32 performs the processing every plurality of bits, and is thereby capable of high-speed processing. Moreover, in the scalar multiplication unit 32, since the scanning order is the same, the memory region for holding the transformed scalar values becomes unnecessary, thus enabling the calculation by a small memory.

Second Embodiment

The calculation of Q+dP or Q+eP in the first embodiment is generalized as Q+cP. When there is a possibility that Q becomes a point at infinity O, and when there is a possibility that Q and cP become equal to each other, special handling is needed. An example of a pseudo code of the addition processing is illustrated in FIG. 10. The pseudo code illustrated in FIG. 10 is a calculation example of Q=Q+cP when both of the above-mentioned possibilities are present. EC_ADD represents point addition of the elliptic curve, where the same point cannot be added.

When the calculation of Q=Q+cP is performed by the pseudo code illustrated in FIG. 10, there is a possibility that an execution time changes depending on which conditional expression is established. In such a case, a pseudo code illustrated in FIG. 13 may be used. FIG. 13 is a diagram illustrating an example of a pseudo code of the addition processing according to the embodiments. R=Q+cP is established. Q_eq_O and Q_eq_cP results of determinations as to Q==O and Q==cP, respectively, and can be obtained in a computation process of EC_ADD.

The scalar multiplication unit 32 according to the second embodiment precomputes all the values to be taken by 2 cP. Then, when adding dp and the variable Q to each other, the scalar multiplication unit 32 selects 2dP as a calculation result in the case where dp and the variable Q indicate the same point, thereby implementing the constant time processing. That is, "2P, and aP for each odd number a" are precomputed in the first embodiment, whereas also "2aP for each odd number a" is precomputed in the second embodiment.

Moreover, as a modification of the above, 2aP is not precomputed, but an intermediate value required to calculate 2aP may be precomputed, and a calculation of 2aP based on that intermediate value may be performed using a part of the calculation of EC_ADD. As the intermediate variable, a slope of a tangential line of the elliptic curve in aP may be precomputed, for example.

Furthermore, as another modification of the above, 2aP is not precomputed, but pseudo codes illustrated in FIG. 11 and FIG. 12 may be used in place of the pseudo codes illustrated in FIG. 10 and FIG. 13. In this case, there is no need to precompute values to be taken by 2 cP, so that it is possible to reduce the processing time for precomputation and the amount of memory required for storing the precomputed values.

Third Embodiment

A scalar multiplication unit 32 according to a third embodiment precomputes some scalar multiplications. When the homogeneous coordinates and the Jacobi coordinates are used in calculation of the scalar multiplications, each point is, for example, three values of X, Y, and Z.

In the present embodiment, at the time of the precomputation, the preprocessing unit 322 performs normalization processing such that a value of Z becomes a unit element. That is, a transformation from (X,Y,Z) into (X·Z⁻¹,Y·Z⁻¹,1) is performed in a case of the homogeneous coordinates, and a transformation from (X,Y,Z) into (X·(Z⁻¹)²,Y·(Z⁻¹)3,1) is performed in a case of the Jacobi coordinates. For this purpose, the preprocessing unit 322 is provided with an inverse computation function for calculating the inverse element $Z^{-1}$ on the finite field.

Moreover, the respective coordinates may be held in the Montgomery expression in order to use the Montgomery modular multiplication. In this case, the unit element is 2n, and the normalization processing is performed by a transformation from (X·2″,Y·2″,Z·2″) into (X·Z⁻¹·2″,Y·Z⁻¹·2″, 2″) in a case of the homogeneous coordinates, and performed by a transformation from (X·2″,Y·2″,Z·2″) into (X·(Z⁻¹)²·2″, Y·(Z⁻¹)³·2″,2″) in a case of the Jacobi coordinates.

According to the third embodiment, the scalar multiplication unit 32 is simply required to hold, for each point, only two values of X and Y, and can reduce a memory usage.

Moreover, in the calculation of Q=Q+cP, it can be assumed that the Z coordinate of cP is a unit element, so that it becomes possible to efficiently calculate the point addition, making it possible to implement the speedup of the whole processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state drive (SSD) memory system comprising:
at least one nonvolatile memory configured to store a message that is a computer program code of firmware, signature data associated with the message, and a coordinate value P;
a random access memory (RAM) configured to receive the firmware at a time of starting the firmware:
a host interface configured to execute transfer of user data between a host computer and the RAM; and
a memory controller, implemented by processing circuitry, configured to
execute the firmware loaded on the RAM:
at he time of starting the firmware, read out the signature data, the coordinate value P, and the message from the at least one nonvolatile memory, generate a hash value of the message and generate a multiplication value k being a bit string of m-bit (m is an integer);
calculate kP as a coordinate value based on the multiplication value k being the input bit string of m-bit input
calculate aP by multiplying at least one integer a and the coordinate value P at a particular point together, the integer a being 2 or more and less than 2w (w is an integer satisfying w>1);
read out the multiplication value k being the bit string of m-bit (m is an integer) by every w bits in order from a most significant bit to a least significant bit, and generate a string of signed odd numbers d of w+1 bits; and
calculate dP by multiplying a head of the string of signed odd numbers d and the coordinate value P together, and inputs the dP to a variable;
execute loop processing predetermined times, the loop processing including
multiplication processing for inputting, to the variable, a value obtained by doubling the variable w times, and
processing for calculating dP by multiplying the coordinate value P and a second, or after, of the string of signed odd numbers d, and inputting, to the variable, a result of adding the dP and the variable to each other; and
calculate a value by multiplying the coordinate value P and a value, being based on lower 2 bits of the multiplication value, k, and obtain the kP as the coordinate value by adding the calculated value and the variable t, and
the memory controller is configured to execute signature verification processing by using the coordinate value kP, the signature, and the hash value of the message,
wherein the multiplication value k is non-confidential and the signature verification processing performed by the processing circuitry is constant time processing, such that a processing time becomes constant irrespective of a value of the secret key.

2. The solid state drive (SSD) memory system according to claim 1, wherein the processing circuitry is configured to precompute aP and 2aP with regard to the integer a, and, when adding the dP and the variable to each other, select 2dP as a calculation result in a case where the dP and the variable indicate a same point.

3. The solid state drive (SSD) memory system according to claim 1, wherein the coordinate value P is indicated by either homogeneous coordinates or Jacobi coordinates.

4. The solid state drive (SSD) memory system according to claim 3, wherein the processing circuitry is configured to execute, as preprocessing, a calculation of an inverse element on a finite field for a Z coordinate of the aP and normalization processing for causing the Z coordinate to become a unit element.

5. The solid state drive (SSD) memory system according to claim 4, wherein the coordinate value P is expressed by Montgomery expression.

6. The solid state drive (SSD) memory system according to claim 1, wherein the integer a is an odd number being 3 or more and less than $2^W$, and the processing circuitry is configured to precompute 2P and aP.

7. The solid state drive (SSD) memory system according to claim 1, wherein the value being based on lower 2 bits of the multiplication value k is any value out of −3, −2, 1, and 2.

8. A solid state drive (SSD) memory system comprising:

a nonvolatile memory configured to store a message that is a computer program code of firmware, signature data associated with the message, and a coordinate value P;

a random access memory (RAM) configured to receive the firmware at a time of starting the firmware;

a host interface configured to execute transfer of user data between a host computer and the RAM; and a memory controller, implemented by processing circuitry, configured to control the nonvolatile memory, wherein the memory controller is configured to:

execute the firmware loaded on the RAM;

at the time of starting the firmware, read out the signature data, the coordinate value P, and the message from the nonvolatile memory and generate a hash value of the message;

calculate aP by multiplying at least one integer a and the coordinate value P at a particular point together, the integer a being 2 or more and less than 2w (w is an integer satisfying w>1);

read out a multiplication value k being a bit string of m-bit (m is an integer) by every w bits in order from a most significant bit to a least significant bit, and generates a string of signed odd numbers d of w+1 bits;

calculate dP by multiplying a head of the string of signed odd numbers d and the coordinate value P together, and inputs the dP to a variable;

execute loop processing predetermined times, the loop processing including multiplication processing for inputting, to the variable, a value obtained by doubling the variable w times, and processing for calculating dP by multiplying the coordinate value P and a second, or after, of the string of signed odd numbers d, and inputting, to the variable, a result of adding the dP and the variable to each other;

calculate a value by multiplying the coordinate value P and a value, being based on lower 2 bits of the multiplication value, k, and outputs, as kP, a value obtained by adding the calculated value and the variable to each other; and execute signature verification processing by using kP as a coordinate value, the signature, and the hash value of the message, wherein the multiplication value k is non-confidential and the signature verification processing performed is constant time processing, such that a processing time becomes constant irrespective of a value of the secret key.

9. The solid state drive (SSD) memory system according to claim 8, wherein the memory controller is configured to precompute aP and 2aP with regard to the integer a, and, when adding the dP and the variable to each other, select 2dP as a calculation result in a case where the dP and the variable indicate a same point.

10. The solid state drive (SSD) memory system according to claim 8, wherein the coordinate value P is indicated by either homogeneous coordinates or Jacobi coordinates.

11. The solid state drive (SSD) memory system according to claim 10, wherein the memory controller is configured to execute, as preprocessing, a calculation of an inverse element on a finite field for a Z coordinate of the aP and normalization processing for causing the Z coordinate to become a unit element.

12. The solid state drive (SSD) memory system according to claim 11, wherein the coordinate value P is expressed by Montgomery expression.

13. The solid state drive (SSD) memory system according to claim 8, wherein the integer a is an odd number being 3 or more and less than $2^W$, and the memory controller is configured to precompute 2P and aP.

14. The solid state drive (SSD) memory system according to claim 8, wherein the value being based on lower 2 bits of the multiplication value k is any value out of −3 , −2, 1, and 2.

* * * * *